US011061902B2

(12) United States Patent
Idicula et al.

(10) Patent No.: US 11,061,902 B2
(45) Date of Patent: Jul. 13, 2021

(54) AUTOMATED CONFIGURATION PARAMETER TUNING FOR DATABASE PERFORMANCE

(71) Applicant: Oracle International Corporation, Redwood Shores, CA (US)

(72) Inventors: Sam Idicula, Santa Clara, CA (US); Tomas Karnagel, Zurich (CH); Jian Wen, Hollis, NH (US); Seema Sundara, Nusha, NH (US); Nipun Agarwal, Saratoga, CA (US); Mayur Bency, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 54 days.

(21) Appl. No.: 16/298,837

(22) Filed: Mar. 11, 2019

(65) Prior Publication Data

US 2020/0125545 A1 Apr. 23, 2020

Related U.S. Application Data

(60) Provisional application No. 62/747,570, filed on Oct. 18, 2018.

(51) Int. Cl.
*G06F 16/2453* (2019.01)
*G06N 20/00* (2019.01)
(Continued)

(52) U.S. Cl.
CPC ...... *G06F 16/24545* (2019.01); *G06F 16/217* (2019.01); *G06N 20/00* (2019.01); *G06N 20/20* (2019.01)

(58) Field of Classification Search
None
See application file for complete search history.

(56) References Cited

U.S. PATENT DOCUMENTS 10,489,215 B1 * 11/2019 Wen .................. H04L 41/0896
10,554,738 B1 * 2/2020 Ren .................... H04L 67/1008
(Continued)

FOREIGN PATENT DOCUMENTS

EP          2 128 798 A1    12/2009
EP          3 101 599 A2    12/2016
WO     WO 2008/133509 A1   11/2008

OTHER PUBLICATIONS

Pudil et al., "Floating Search Methods in Feature Selection", dated Jun. 19, 1993, 9 pages.
(Continued)

*Primary Examiner* — Kim T Nguyen
(74) *Attorney, Agent, or Firm* — Hickman Becker Bingham Ledesma LLP

(57) ABSTRACT

Embodiments implement a prediction-driven, rather than a trial-driven, approach to automate database configuration parameter tuning for a database workload. This approach uses machine learning (ML) models to test performance metrics resulting from application of particular database parameters to a database workload, and does not require live trials on the DBMS managing the workload. Specifically, automatic configuration (AC) ML models are trained, using a training corpus that includes information from workloads being run by DBMSs, to predict performance metrics based on workload features and configuration parameter values. The trained AC-ML models predict performance metrics resulting from applying particular configuration parameter values to a given database workload being automatically tuned. Based on correlating changes to configuration parameter values with changes in predicted performance metrics, an optimization algorithm is used to converge to an optimal set of configuration parameters. The optimal set of configu-
(Continued)

ration parameter values is automatically applied for the given workload.

36 Claims, 5 Drawing Sheets

(51) Int. Cl.
*G06F 16/21* (2019.01)
*G06N 20/20* (2019.01)

(56) References Cited

U.S. PATENT DOCUMENTS

| | | | | |
|---|---|---|---|---|
| 10,606,649 | B2* | 3/2020 | Baggerman | G06F 9/5027 |
| 2010/0153956 | A1* | 6/2010 | Capps, Jr. | G06F 9/5044 |
| | | | | 718/102 |
| 2014/0344193 | A1 | 11/2014 | Bilenko et al. | |
| 2016/0004621 | A1* | 1/2016 | Gongloor | G06F 16/217 |
| | | | | 707/688 |
| 2017/0068675 | A1* | 3/2017 | Hazel | G06F 16/23 |
| 2018/0107711 | A1* | 4/2018 | Tariq | G06F 16/217 |
| 2019/0095756 | A1 | 3/2019 | Agrawal | |
| 2019/0095818 | A1 | 3/2019 | Varadarajan | |
| 2019/0340095 | A1* | 11/2019 | Faibish | G06F 11/3414 |
| 2020/0034197 | A1* | 1/2020 | Nagpal | G06N 20/00 |
| 2020/0118036 | A1 | 4/2020 | Karnagel | |
| 2020/0125568 | A1* | 4/2020 | Idicula | G06F 16/24545 |
| 2020/0327357 | A1 | 10/2020 | Karnagel | |

OTHER PUBLICATIONS

Narendra et al., "A Branch and Bound Algotithm for Feature Subset Selection", IEEE Transactions on Computers, vol. C-26, No. 9, dated Dec. 1977, 6 pages.
Molina et al., "Feature Selection Algorithms: A Survey and Experimental Evaluation", dated 2002, 19 pages.
Microsoft Docs, "Feature Selection Modules", dated May 5, 2019, 7 pages.
Kohavi, Ron, "Wrappers for Performance Enhancement and Oblivious Decision Graphs", dated Sep. 1995, 304 pages.
Hutter et al., "Automatic Machine Learning: Methods, Systems, Challenges", dated Oct. 16, 2018, 250 pages.
Guyon et al., "An Introduction to Variable and Feature Selection", Journal of Machine Learning Research 3 dated 2003, 26 pages.
Chandrashekar et al., "A survey on feature selection methods", Computers and Electrical Engineering 40 dated 2014, 13 pages.
Brown et al., "Conditional Likelihood Maximisation: A Unifying Framework for Information Theoretic Feature Selection", Journal of Machine Learning Research 13 (2012), 40 pages.
Albon, Chris, "ANOVA F-Value for Feature Selection", dated Dec. 20, 2017, 2 pages.
Caruana et al., "Ensemble Selection From Libraries of Models", Proceedings, Twenty-First International Conference on Machine Learning: dated Jul. 2004, 8 pages.
Ganapathi, A. et al. "Predicting multiple performance metrics for queries: Better decisions enabled by machine learning", ICDE 2009, 12 pages.
Feurer et al. "Efficient and Robust Automated Machine Learning", dated 2015, 9 pages.
Duggan et al., ". Modeling and Prediction of Concurrent Query Performance". SIGMOD, dated 2011.
Duan et al., "Tuning Database Configuration Parameters with iTuned", VLDB dated 2009, 12 pages.
Doan et al., "Selecting Machine Learning Algorithms using Regression Models", https://www.researchgate.net/publication/ 304298580, dated Nov. 2015, 8 pages.
Aldave et al., "Systematic Ensemble Learning fro Regression" dated Mar. 28, 2014, pp. 1-38.

Chen Chi-Ou et al., "Machine Learning-Based Configuration Parameter Tuning on Hadoop System", dated Jun. 27, 2015, IEEE, pp. 386-392.
J.D Wichard, "Model Selection in an Ensemble Framework", The 2013 International Joint Conference on Neural Networks, dated Jan. 1, 2006, pp. 2187-2192.
Bergstra et al., "Random Search for Hyper-Parameter Optimization", Journal of Machine Learning Research 13 (2012) 281-305, dated Feb. 2012, 25 pages.
Bergstra et al., "Making a Science of Model Search: Hyperparameter Optimization in Hundreds of Dimensions for Vision Architectures", JMLR: W &CP, vol. 28, dated 2013, 9 pages.
Bergstra et al., "Hyperparameter Optimization and Boosting for Classifying Facial Expressions: How good can a "Null" Model be?", ICML Workshop on Representation and Learning, dated 2013, 7 pages.
Bergstra et al., "Hyperopt: A Python Library for Optimizing the Hyperparameters of Machine Learning Algorithms", Proc. of the 12th Python in Science Conf. (SCIPY 2013), dated 2013, 8 pages.
B. Debnath et al., SARD: A statistical approach for ranking database tuning parameters. In ICDEW, pp. 11-18, dated 2008.
Andrychowicz et al., "Learning to learn by gradient descent by gradient descent", 30th Conference on Neural Information Processing Systems dated (NIPS 2016), Barcelona, Spain, 9 pages.
Doan et al., "Algorithm Selection Using Performance and Run Time Behavior", Chapter, Artificial Intelligence: Methodology, Systems and Applicationsm AIMSA dated Sep. 2016, pp. 3-13.
Pedregosa, Fabian, "Hyperparameter Optimization with Approximate Gradient", Proceedings of the 33rd International Conference on Machinelearning, New York, vol. 48, dated Jun. 26, 2016, pp. 1-15.
Weinberger et al., "Unsupervised learning of image manifolds by semidefinite programming", IEEE, dated Jun. 27, 2004, 10 pages.
Van Aken et al., "Automatic Database Management System Tuning Through Large-scale Machine Learning," Proceedings of the 2017 ACM International Conference on Management of Data, 2017, pp. 1009-1024.
Sullivan et al., "Using probabilistic reasoning to automate software tuning", In SIGMETRICS, dated 2004, 13 pages.
Snoek, "Practical Bayesian Optimization of Machine Learning Algorithms", dated 2012, 9 pages.
Simpson et al, "Automatic Algorithm Selection in Computational Software Using Machine Learning", dated 2016, 10 pages.
Scikit Learn, "3.2. Tuning the hyper-parameters of an estimator", http://scikitlearn.org/stable/modules/grid_search.html, dated 2017, 6 pages.
Gonnet et al., Automatic Problem-Specific Hyperparameter Optimization and Model Selection for Supervised Machine Learning, Technical Report, dated Jan. 1, 2015, 54 pages.
Pinter, Janos, "Calibrating Artificial Neural Networks by Global Optimization", Technical Report, Özyeğin University, Istanbul Submitted for publication: Jul. 2010, 17 pages.
Gonzalez et al., "Batch Bayesian Optimization via Local Penalization", Proceedings of the 19th International Conference on Artificial Intelligence and Stats JMLR: W&CP vol. 41, dated 2016, 10 pages.
Nelder et al., "A Simplex Method for Function Minimization", The Computer Journal, vol. 7, dated Apr. 1, 1964, pp. 308-313.
Narayanan et al., "Continuous resource monitoring for self-predicting DBMS", IEEE International Symposium on Modeling, Analysis and Simulation of Computer and Telecommunication Systems, 2005, 10 pages.
Mendes-Moreira et al., "Ensemble Approaches for Regression", ACM Computing Surveys, ACM, New York, NY vol. 45, No. 1, dated Dec. 7, 2012, pp. 1-40.
Kuck et al, "Meta-learning with neural networks and landmarking for forecasting model selection an empirical evaluation of different feature sets applied to industry data", dated Jul. 24-29, 2016, 8pgs.
Jennie Duggan et al., ". Modeling and Prediction of Concurrent Query Performance". SIGMOD, dated 2011, 12 pages.
Zilio, D.C.A. "DB2 design advisor: integrated automatic physical database design" VLDB dated 2004, Proceedings of the Thirtieth international conference on Very large data bases, 11 pages.

(56) References Cited

OTHER PUBLICATIONS

Reif et al., "Meta-learning for evolutionary parameter optimization of classifiers, Machine Learning", dated 2012, 24 pages.

Prasad et al., "Distributed Feature Selection Using Vertical Partitioning for High Dimensional Data", ICACCI, dated Sep. 12, 2016, 8 pages.

Moran-Fernandez et al., "Centralized vs. Distributed Feature Selection Methods Based on Data Complexity Measures", Knowledge-based Systems, dated Sep. 28, 2016, 20 pages.

Bolon-Canedo et al., "Distributed Feature Selection: An Application to Microarray Data Classification", Applied Soft Computing, dated Feb. 7, 2015, 16 pages.

Singh et al., "Literature Review on Feature Selection Methods for High-Dimensional Data", International Journal of Computer Applications, vol. 136, No. 1, dated Feb. 2016, 9 pages.

Parmezan et al., "Metalearning for Choosing Feature Selection Algorithms in Data Mining: Proposal of a New Framework", Preprint submitted to Expert Systems with Applications, Nov. 4, 2016, 66 pgs.

Microsodt Docs, "Feature Selection in the Team Data Science Process", dated Nov. 20, 2017, 5 pages.

Li et al., "Feature Selection: A Data Perspective", AMC, Computer Suru 9, Article 39, dated Mar. 2010, 45 pages.

Krupka et al., "Learning to Select Features using their Properties", Journal of Machine Learning Research 9, dated 2008, 28 pages.

Zhen Hua Liu et al. "JSON Data Management in RBDMS", Emerging Technologies and Applications in Data Processing and Management, dated May 13, 2019, pp. 20-45.

Knut Anders Hatlen, "Partial Update of JSON Values", MySQL Server Blog, dated Apr. 3, 2018, 6 pages.

Bryan P et al., "JavaScript Object Notation (JSON) Patch; rfc6902.txt", Javascript Object Notation (JSON) Patch, Internet Engineering Task Force, Standard, Internet Society, Apr. 3, 2013, 18 pages.

\* cited by examiner

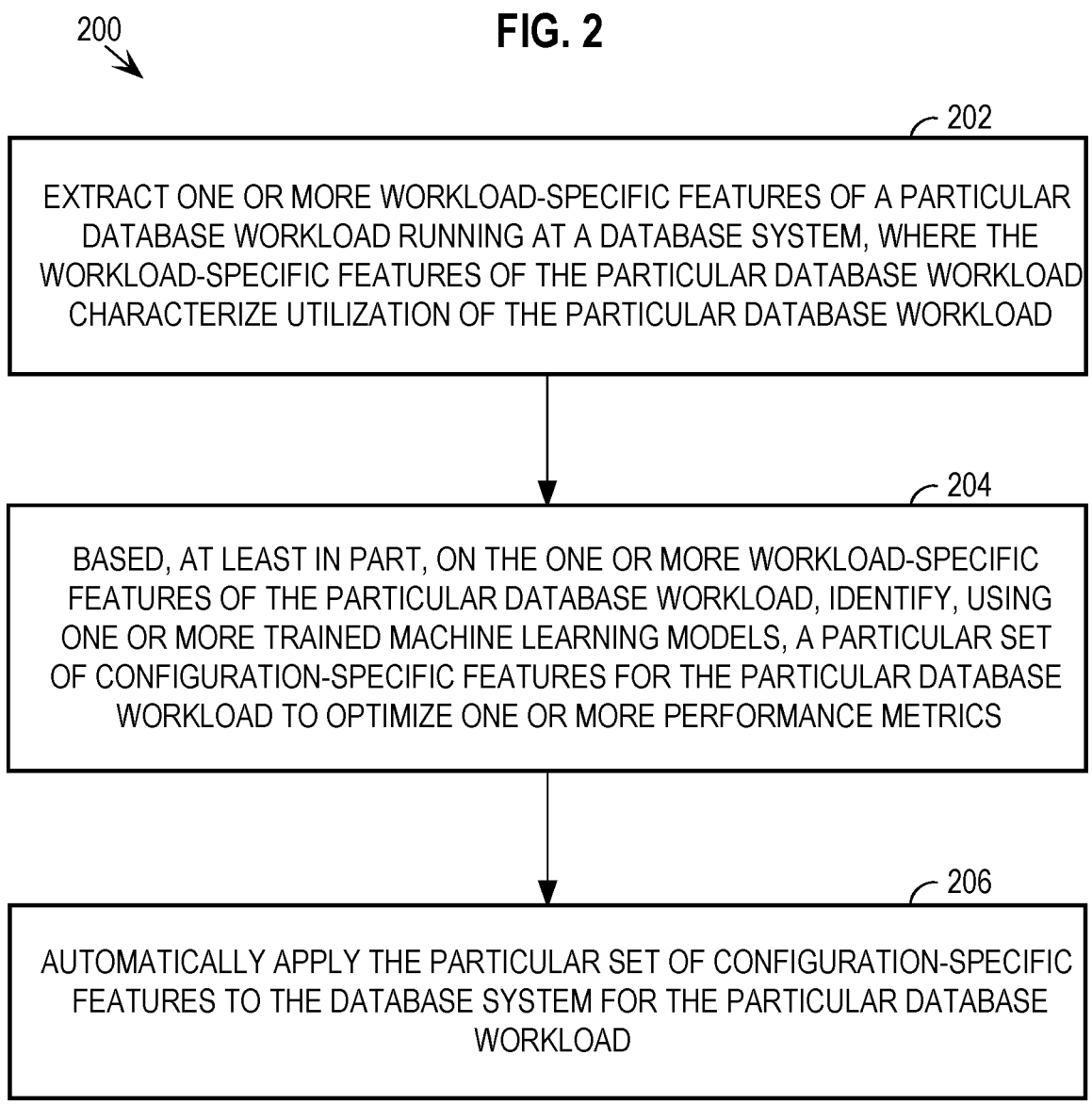

TRAIN ONE OR MORE MACHINE LEARNING MODELS, TO PRODUCE ONE OR MORE TRAINED MACHINE LEARNING MODELS, USING A TRAINING CORPUS WITH DATA REGARDING DATABASE WORKLOADS, INCLUDING BENCHMARKING FEATURES AND PERFORMANCE METRICS OF THE DATABASE WORKLOADS

304

IDENTIFY, USING THE ONE OR MORE TRAINED MACHINE LEARNING MODELS, ONE OR MORE EXPERIMENTAL VALUES FOR ONE OR MORE CONFIGURATION PARAMETERS

306

AUTOMATICALLY RUN A PARTICULAR EXPERIMENT BY CAUSING A DATABASE MANAGEMENT SYSTEM TO MANAGE A PARTICULAR WORKLOAD BASED ON THE ONE OR MORE EXPERIMENTAL VALUES FOR THE ONE OR MORE CONFIGURATION PARAMETERS

308

ADD, TO THE TRAINING CORPUS TO PRODUCE AN UPDATED TRAINING CORPUS, DATA FROM THE PARTICULAR EXPERIMENT THAT COMPRISES ONE OR MORE RESULTING PERFORMANCE METRICS FROM THE PARTICULAR EXPERIMENT AND THE ONE OR MORE EXPERIMENTAL VALUES FOR THE ONE OR MORE CONFIGURATION PARAMETERS

AUTOMATED CONFIGURATION PARAMETER TUNING FOR DATABASE PERFORMANCE

BENEFIT CLAIM; RELATED APPLICATIONS

This application claims the benefit of Provisional Appln. 62/747,570, filed Oct. 18, 2018, the entire contents of which is hereby incorporated by reference as if fully set forth herein, under 35 U.S.C. § 119(e).

Furthermore, this application is related to the following applications, the entire contents of each of which is hereby incorporated by reference as if fully set forth herein:

Provisional U.S. Patent Application No. 62/745,587, titled "Automatic Feature Subset Selection Using Feature Ranking and Scalable Automatic Search" (referred to herein as the "AutoFS Application"), filed Oct. 15, 2018;

U.S. patent application Ser. No. 15/884,163, titled "Algorithm-Specific Neural Network Architectures for Automatic Machine Learning Model Selection" (referred to herein as the "AutoML Application"), filed Jan. 30, 2018; and U.S. patent application Ser. No. 15/885,515, titled "Gradient-Based Auto-Tuning for Machine Learning and Deep Learning Models" (referred to herein as the "MLAutoTune Application"), filed Jan. 31, 2018.

FIELD OF THE INVENTION

The present invention relates to database system configuration and, more specifically, to automatically tuning the configuration parameters of a database system to optimize database performance for a given database workload.

BACKGROUND

Modern database systems have a complex data processing architecture whose performance depends on many different factors. As a large software product with many optimization considerations, getting efficient performance from a database system requires proper setup and tuning. However, database users often find that it is difficult, or even impossible, to adjust the configuration of such a complex system to meet their performance goals, which are usually encoded in some form of service-level agreement (SLA).

Fine-tuning a database system to meet performance goals becomes even harder for a user to control when database systems are deployed through cloud infrastructure because such systems are generally delivered as a preinstalled and pre-configured service. In this case, the user relies on the expertise of the cloud service provider to properly tune the database system being provided. However, cloud service providers generally manage database systems for many users, and it can be difficult to properly maintain the configuration of each system to suit each user's specific workload and performance requirements. It can be very costly to hand-tune every database system managed by a cloud service provider.

Existing automatic solutions for fine-tuning database systems are mostly cost-based and heuristic-driven. For example, IBM DB2 Designer utilizes a cost-model based approach to pick an optimized index strategy. Microsoft SQL Server provides similar tools to provide advice on resource management. There have also been statistical approaches for ranking database parameters. However, none of these techniques have been found to be accurate across a wide range of workload features and configuration parameters, and therefore, are not sufficiently flexible to address all kinds of configuration issues that arise.

Many researchers have tried to increase the range of automatic database parameter tuning in statistic-based or machine learning-based approaches. For example, a probabilistic methodology has been proposed for general automated software tuning on multiple parameters. This methodology uses influence diagrams to guide the search for database parameter values and to capture interactions between the parameters. However, influence diagrams are software-specific, and building an influence diagram requires expert knowledge regarding the target software. As such, this influence diagram-based methodology is not accessible to users that are not experts in the database technology that they seek to optimize, and requires expert intervention any time new software must be diagrammed.

Furthermore, iTuned is a system for end-to-end database parameter tuning using Gaussian Process-based modeling. This system reduces the search space for experiments used during the training data generation. However, this system is tied to using a specific probabilistic model in its adaptive sampling approach.

Further, iTuned requires running the target workload for multiple trials before getting enough information to reach a good prediction for tuning the parameters of the workload. Other works, like OtterTune, use a machine learning-based approach, but also need several trials on the database workload being tuned before a good prediction of configuration parameter values can be made. Performing such trials on a target database workload can be detrimental to both computing efficiency and customer relations because these trials require time to converge to a good configuration, and, meanwhile, the customer's system may experience performance degradation due to poor configurations being tested in the system.

Thus, it would be beneficial to provide an adaptive method, for fine-tuning a database system for a given workload, which is efficient and which does not require live trials of potentially sub-optimal configuration parameter values.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 2 depicts a flowchart for automatically tuning configuration parameters for a given database workload.

FIG. 3 depicts a flowchart for a training data generation framework automatically performing experiments, using known workloads, to expand the amount of usable data in the training corpus.

DETAILED DESCRIPTION

Figure 1:
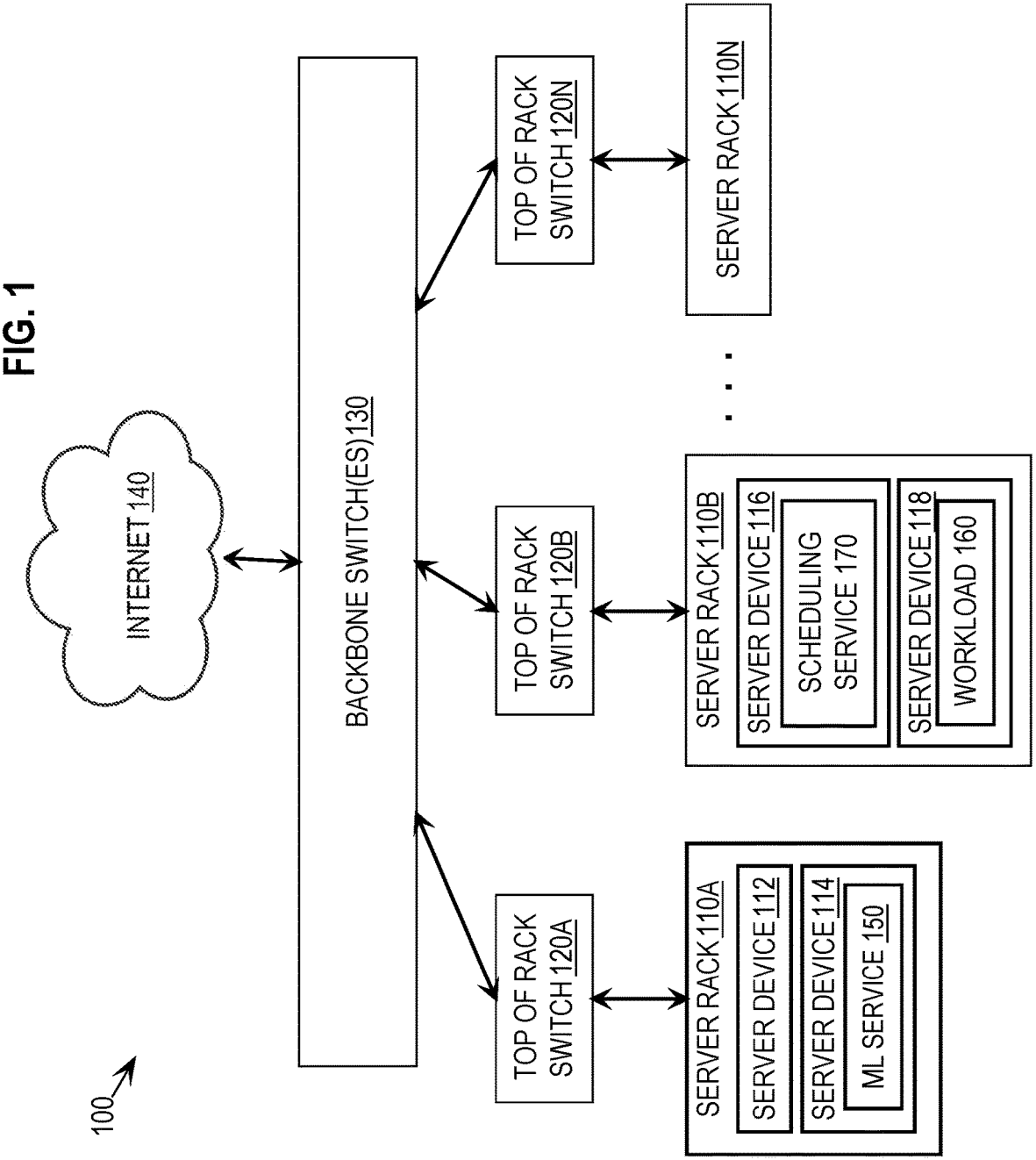
FIG. 1 depicts an example network of computing devices on which embodiments may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Embodiments implement a prediction-driven, rather than a trial-driven, approach to automate database configuration parameter tuning for a given database workload. This prediction-driven approach involves using machine learning (ML) models to test performance metrics resulting from application of particular database parameters to a database workload, and does not require live trials on the database management system (DBMS) managing the workload. Specifically, one or more automatic configuration machine learning (AC-ML) models are trained using a detailed training corpus that includes information from workloads being run by DBMSs having a variety of configuration parameter values. The AC-ML models are trained to predict performance metrics based on workload features and configuration parameter values.

According to an embodiment, the trained AC-ML models are used as proxies for applying different sets of configuration parameter values to database management systems running particular database workloads. Specifically, the trained AC-ML models predict performance metrics resulting from applying particular configuration parameter values to particular database workloads. Based on correlating changes to configuration parameter values with changes in predicted performance metrics, one or more trained AC-ML models are used to converge to an optimal set of configuration parameters that optimizes predicted database performance for workloads.

Using this prediction-based approach minimizes the negative impact of exploration of configuration parameter values for a given workload on the user, where the user is an entity that controls the workload. Furthermore, performing inference on the AC-ML models to predict performance metrics is a very inexpensive procedure, especially when compared to performing a live trial, given that live trials must be performed over time and ML model inference on a trained model is performed very quickly and without intensive computation requirements.

According to an embodiment, if predicted performance metrics for an identified set of optimal configuration parameter values for the given database workload satisfies requirements that the user has identified for the workload, the identified set of configuration parameter values is automatically applied to the DBMS that manages the database workload. In this way, the set of configuration parameter values that is applied to the live database workload is predicted to have optimal performance metrics that meet the user requirements indicated in the SLA for the workload. Such automatic tuning of the database configuration parameters minimizes the potential of applying sub-optimal configuration parameter values that would result in poor DBMS performance.

According to an embodiment, machine learning techniques are used to reduce the search space for optimal sets of configuration parameters. Specifically, in general, changes to the values of some DBMS configuration parameters have no effect on performance metrics for the DBMS. Thus, in this embodiment, one or more configuration parameter impact analysis machine learning (CPE-ML) models are trained to identify "impactful" configuration parameters, changes to which affect performance metrics. Based on inference over the trained CPE-ML models, which identifies impactful configuration parameters, the configuration parameter search space for the AC-ML models may be limited to the identified impactful configuration parameters. This reduced search space reduces the amount of processing needed to train the AC-ML models.

These machine learning models benefit from being trained over a highly-detailed and comprehensive training corpus, which, according to an embodiment, is generated by a training data generation framework that utilizes machine learning techniques to intelligently expand the data in the training corpus. Specifically, according to an embodiment, the training data generation framework gathers an initial set of training data from historical records of workloads being run by DBMSs and/or benchmark information. The training data generation framework expands this initial set of training data by formulating and scheduling experiments that involve intelligently varied workload characteristics and configuration parameter values in order to gather additional performance information for a wide range of workload types and database system configurations.

According to an embodiment, the training data generation framework includes one or more data generation machine learning (DG-ML) models that are trained over the initial training corpus to identify areas of information that is not yet in the training corpus. Inference over these DG-ML models provides combinations of workload characteristics and configuration parameter values that are not yet represented in the training corpus. The training data generation framework automatically schedules experiments, based on the data from the DG-ML models, over available workloads that have the indicated workload characteristics. The results of these experiments are automatically added to the training corpus over which the machine learning models are trained. This automatic expansion of the training corpus results in more thorough training of ML models and more accurate predictions by the trained ML models, which, in turn, allows automatic tuning of DBMS configuration parameters to be performed more efficiently and accurately.

Training the Automatic Configuration Machine Learning Models

According to an embodiment, one or more AC-ML models are trained, over a training corpus that includes benchmarking features (including workload features and configuration features), and also resulting performance metrics, to predict performance metrics given particular combinations of benchmarking features. The trained AC-ML models are used to identify, for a given database workload, a set of configuration parameter values that is predicted to optimize one or more performance metrics. According to one or more embodiments, a database workload refers to both (a) a dataset being managed by a particular DBMS, and (b) the nature and frequency of queries being run over the dataset. The benchmarking features used by the AC-ML models, based on which the trained AC-ML models predict performance metrics, include workload-specific features (WSFs) and configuration-specific features (CSFs). DBMS configuration parameters are generally tuned within either a valid range of numeric values, or a set of categorical values WSFs are workload-specific characteristics that may be used to identify the nature of the workload. As such, WSFs depend on the utilization of the dataset being managed by the DBMS. Examples of WSFs include: a number of different kinds of operations (such as insert statements, select statements, etc.) being used in queries over the dataset; an extent of the queries over the dataset; binary lengths of records being inserted into the dataset; data types being used in queries over the dataset; a number of joins in queries over the dataset; aggregation-type operations being performed over the dataset; etc. According to an embodiment, WSFs for a given database workload include one or more aggregate features that are generated by automatically aggregating more than one simple WSF, as described in further detail below.

CSFs are values of configuration parameters that may be used by a DBMS running a database workload. The CSFs affect how the workload is run, but are not dependent on the nature of the workload. Examples of CSFs include: an amount of memory available for the workload; types of joins allowed to be used for queries over the workload; kinds of operators that are allowed to be used for the workload; whether indexes are enabled for the workload; etc. These CSFs may be tuned, according to embodiments described herein, to optimize performance metrics for a given database workload. Identifying and applying a set of optimal CSFs to a given database workload is referred to herein as tuning the configuration parameters for the given database workload.

According to an embodiment, a given ML model is specific to a combination of a particular database management system version and particular hardware on which the DBMS version runs. Thus, new ML models are trained based on any a new version or type of DBMS, or any new kind of hardware becoming available on which to run the DBMS, using training data that was generated using the new software/hardware combination.

Furthermore, according to an embodiment, each ML model is specific to a particular kind of database performance metric, such as a throughput performance metric that indicates how many statements are being performed by a DBMS per unit of time, which is optimized via maximization. As another example, a timing performance metric indicates an average of how much time it takes for statements to be performed by the DBMS, and is optimized via minimization. Making ML models that are specific to a particular kind of performance metric allows the model training to focus on optimization of the associated performance metric.

Initiating Automatic Tuning of Configuration Parameters

FIG. 1 depicts an example network 100 of computing devices on which embodiments may be implemented. Network 100 includes server racks 110A-N (representing an arbitrary number of server racks in network 100), each of which hosts one or more server computing devices. Embodiments are described herein as being implemented by an ML service 150 running on a server device 114 of network 100. However, any number of applications running on any configuration of hardware devices may implement features described herein.

According to an embodiment, ML service 150 determines to tune configuration parameters, using previously-trained AC-ML models, for a database workload 160 being managed by a DBMS running on a server device 118. This determination may be based on an explicit request to automatically tune the configuration of the DBMS to optimize its performance with respect to workload 160. According to an embodiment in which workload 160 is an unknown workload at the time of the request, the user submits, with the request, a sample of workload 160 to facilitate customized configuration parameter tuning. ML service 150 extracts one or more WSFs, from the sample workload, in order to characterize workload 160 for parameter optimization. According to an embodiment, this workload sample is also added to a data store that stores a set of workloads that are available to ML service 150 for training data generation framework-initiated experiments described in further detail below.

Further, the determination to tune the configuration parameters being used for database workload 160 may be based on determining that one or more WSFs of the workload have changed, which is an indicator that the nature of the workload has changed. For example, workload 160 is a known analytical workload being managed at server device 118 (a known workload has run on the associated server device for a length of time) when ML service 150 detects changes to one or more WSFs of the workload. The changes to the one or more WSFs of workload 160 indicate that the type of the workload has changed from analytical to transactional. Because of the change in the type of workload 160, the workload may require different configuration parameters to run efficiently than were utilized when the workload was an analytical workload. According to an embodiment, ML service 150 determines to automatically tune the DBMS configuration for workload 160 after the detected changes persist for at least a threshold amount of time. According to an embodiment, ML service 150 maintains information indicating which workload features are WSFs, as described in detail below.

Furthermore, the determination to tune the configuration parameters being used for database workload 160 may be based on determining that one or more predicted performance metrics, predicted using the WSFs of workload 160 and the current CSFs being used to manage workload 160, do not meet one or more performance requirements for workload 160, such as requirements indicated in an SLA for the workload. The predicted performance metrics are determined based on inference performed over one or more trained AC-ML models.

Identifying Workload-Specific Features

FIG. 2 depicts a flowchart 200 for automatically tuning configuration parameters for a given database workload. At step 202 of flowchart 200, one or more workload-specific features of a particular database workload running at a database system are extracted, where the workload-specific features of the particular database workload characterize utilization of the particular database workload. For example, in response to determining to tune the configuration parameters for workload 160, ML service 150 automatically extracts one or more WSFs for workload 260 as it is managed by the DBMS on server device 118.

WSFs of a workload are indicative of the type of the workload. Thus, WSFs do not change for a given workload even after varying the database configurations being used for the workload or after varying the amount of time over which the workload is observed. According to an embodiment, in a pre-processing step prior to training the AC-ML models, ML service 150 automatically classifies a set of workload features as WSFs based on information from the training corpus.

Identifying those WSFs, which characterize the nature of a workload, can be challenging because most of the simple (non-aggregate) workload features that are recorded in a training corpus are dependent both on the nature of the workloads and also on the configuration parameter values being applied to the workloads. Thus, according to an embodiment, WSFs are automatically identified not only from simple features found in the training corpus, but also from one or more aggregate features that are generated by automatically combining more than one simple feature.

For example, for a transactional workload whose number of queries could be different depending on the period of time over which the workload is observed, the simple workload attribute "Byte_received" is not a WSF because the feature is dependent on the number of queries performed in the workload. According to an embodiment, ML service 150 automatically determines that an aggregate feature, which represents a ratio between the two simple workload features "Byte_received" and "Queries", is a WSF that remains constant without respect to the period of time over which the workload is observed or the configuration parameters being applied to the workload, thus isolating workload specific factors in the aggregate feature.

According to an embodiment, different workloads in the training corpus are labeled with type metadata indicating a known workload type. As such, workloads that are labeled as the same type should have consistent WSFs. ML service 150 automatically identifies WSFs for the type of workload by determining simple or aggregate workload features that are consistent across those workloads that are labeled as the same type.

Identifying an Optimal Set of Configuration-Specific Features for a Given Workload At step 204 of flowchart 200, based, at least in part, on the one or more workload-specific features of the particular database workload, a particular set of configuration-specific features are identified, using one or more trained machine learning models, for the particular database workload to optimize one or more performance metrics. For example, a user for workload 160 provides instructions to optimize workload 160 (running on server device 118) over a particular performance metric, such as a throughput performance metric. ML service 150 identifies a particular trained AC-ML model that is specific to the DBMS running on server device 118, to the type of hardware used in server device 118, and to the indicated throughput performance metric. ML service 150 performs inference over the identified AC-ML model to determine different predicted throughput performance metrics for workload 160 based on (a) the WSFs for workload 160, and (b) a plurality of potential sets of CSFs.

Different optimization strategies can be used to converge to an optimal set of CSFs for workload 160 based on (a) changing CSFs used to identify predicted performance metrics from the AC-ML models, and (b) observing the resulting changes to the predicted throughput performance metrics. For example, random search, grid search, and Bayesian optimization are all candidate optimization strategies that can be used by ML service 150 to converge to a set of CSFs that result in optimal predicted throughput performance for workload 160.

According to an embodiment, in response to determining to tune the configuration parameters of workload 160 to optimize a particular user-selected performance metric and based on WSFs extracted from workload 160, ML service 150 performs inference, over the identified AC-ML model, to identify one or more initial sets of CSFs. These one or more initial sets of CSFs are those CSFs in the trained AC-ML model that have potential to optimize workloads having the WSFs of workload 160, and may be a random sampling of such CSFs. ML service 150 uses the identified AC-ML model to determine a predicted performance metric for each of the one or more initial sets of CSFs.

Subsequently, according to an optimization strategy used by ML service 150 (such as grid search), the service produces multiple adjusted sets of CSFs, having one or more values that are different than the values of the one or more initial sets of CSFs. To illustrate in the case of a grid search optimization strategy being employed by ML service 150, the service employs a respective grid search starting from each of a subset of the one or more initial sets of CSFs having a predicted performance metric that is higher than a given pre-determined threshold (e.g., in the top 50% of predicted performance metrics that were predicted for the one or more initial sets of CSFs). From the grid search based on the most-likely optimal initial sets of CSFs, ML service 150 identifies the multiple adjusted sets of CSFs for further exploration. Exploration of these adjusted sets of CSFs determines whether any adjustments to the most-likely optimal initial sets of CSFs result in sets of CSFs with higher predicted performance metrics.

ML service 150 then observes changes in predicted performance, retrieved using the identified AC-ML model, for those adjusted sets of CSFs. ML service 150 automatically further explores, using the identified AC-ML model, those features that caused the most positive impact on the predicted throughput performance metric to determine whether further changes to those features make additional improvements to the predicted performance metric. ML service 150 selects, for workload 160, a set of CSFs that the identified AC-ML model predicts will have the best performance metric out of all of the explored sets of CSFs.

Applying the Identified Set of Configuration-Specific Features to the Workload

At step 206 of flowchart 200, the set of configuration-specific features are automatically applied to the database system for the particular database workload. According to an embodiment, ML service 150 continues to search for a set of CSFs to apply for workload 160 until a threshold level of confidence is achieved regarding the optimization of the predicted performance metric resulting from application of the set of CSFs. In this embodiment, once ML service 150 has identified a set of CSFs to use for workload 160, ML service 150 compares the predicted performance metric for the set of CSFs to the user performance requirements for the workload. ML service 150 automatically applies the identified set of CSFs in the DBMS managing workload 160 in response to determining that the predicted performance metric for the set of CSFs satisfies an associated user performance requirement for the workload.

For example, workload 160 is associated with a service-level agreement that requires a minimum average throughput requirement of 5000 statements per second for workload 160. Based on the trained AC-ML models, ML service 150 predicts that the throughput metric for workload 160 using the identified set of CSFs is an average of 7000 statements per second, which satisfies the associated throughput requirement. In response to determining that the predicted performance for workload 160, using the identified set of CSFs, satisfies the performance requirement for the workload, ML service 150 automatically causes the set of CSFs to be applied to the DBMS running workload 160 on server device 118.

According to another embodiment, while ML service 150 performs the search for an optimal set of CSFs for workload 160, ML service 150 periodically determines whether any of the predicted performance metrics, for sets of CSFs being tested using the AC-ML models, satisfy an associated performance requirement for workload 160. In this embodiment, ML service 150 halts the search for an optimal set of CSFs when one or more of the sets of CSFs is associated with a predicted performance metric that satisfies an associated user requirement for workload 160.

According to an embodiment, if ML service 150 arrives at the threshold level of confidence that an identified set of CSFs is the optimal set of CSFs for workload 160 running on server device 118, and the predicted performance metric for the optimal set of CSFs does not satisfy an associated user requirement for the performance metric, ML service 150 performs one or more of a set of remedial actions. The set of remedial actions includes:

- Informing the user that the performance requirement for workload 160 is unlikely to be attained using the version of the DBMS and/or hardware of server device 118.
- According to an embodiment, this information includes the predicted performance metric for the identified optimal set of CSFs.
- Performing a further search for an alternative optimal set of CSFs for a different combination of DBMS version and computer hardware, where the predicted performance metric for the alternative set of CSFs does satisfy the associated user requirement for the performance metric. Upon finding that another combination of software and hardware can satisfy the requirements of the user, ML service 150 automatically informs the user regarding the recommended change in software and/or hardware.

Identifying Impactful Configuration Parameters

According to an embodiment, machine learning techniques are used to reduce the search space of configuration parameters. Specifically, there can be hundreds of configuration parameters being applied to any given workload. However, not all configuration parameters that may be applied to a workload affect performance metrics for the workload. Thus, by using machine learning techniques to identify those configuration parameters that affect performance metrics (referred to herein as "impactful" configuration parameters), the search for optimal sets of CSFs may be limited to those configuration parameters that have been determined to be impactful.

For example, in the case of a known workload 160 being managed on server device 118 at the time that it is determined to automatically tune the configuration parameters for the workload, the configuration parameters that have been previously found to not be impactful are not varied from the values currently being used by the DBMS managing workload 160. This reduction of the configuration parameter search space greatly reduces the potential combinations of CSFs that must be tested to find an optimal set of CSFs for workload 160.

Further, in addition to cutting down the time it takes to search for optimal CSFs, this reduction of the configuration parameter search space cuts down on ML model training time. Specifically, ML models described herein need not generate correlations between non-impactful configuration parameter values and performance metrics, which reduces the amount of data that must be analyzed during the training phase of the ML models.

Thus, according to an embodiment, prior to training the AC-ML models, ML service 150 uses machine learning techniques to identify a set of impactful configuration parameters, which affect workload performance metrics. Specifically, ML service 150 trains one or more configuration parameter evaluation machine learning (CPE-ML) models, over a similar (or the same) training corpus as is used to train the AC-ML models, to identify which configuration parameters affect one or more performance metrics. According to an embodiment, once ML service 150 performs inference over the trained CPE-ML models for every possible configuration parameter to determine which configuration parameters affect performance metrics, ML service 150 maintains the information identifying the impactful configuration parameters, e.g., in a database table.

Optimizing Multiple Performance Metrics

According to an embodiment, a user provides information for two or more performance metrics for which the user would like to balance optimization. In this embodiment, ML service 150 identifies an optimal set of CSFs for each of the indicated performance metrics, as described above. Then, ML service 150 performs a search, based on the identified optimal sets of CSFs, for one or more "overall optimal" sets of CSFs. According to an embodiment, an "overall optimal" set of CSFs, which is optimized with respect to multiple performance metrics, is considered to not satisfy user requirements if the predicted performance of the overall optimal set of CSFs does not satisfy requirements for any of the indicated performance metrics.

According to an embodiment, when no one set of CSFs optimizes all of the target performance metrics, ML service 150 identifies multiple pareto-optimal sets of CSFs that variously optimize different user-identified target performance metrics. For example, a user indicates the following joint target performance metrics for workload 160: maximizing a throughput performance metric, and minimizing a maximum latency performance metric. In this example, ML service 150 identifies, using techniques described above, two sets of CSFs for workload 160, where each of the identified sets of CSFs optimizes one of the performance metrics while not optimizing the other.

To illustrate, a first identified set of CSFs is predicted to have first performance metrics (throughput=30000, and maximum latency=0.5), and a second identified set of CSFs is predicted to have second performance metrics (throughput=29000, and maximum latency=0.4). Although the first identified set of CSFs is predicted to have a better throughput performance metric, the second identified set of CSFs is predicted to have a better maximum latency. Based on the pareto-optimal technique, ML service 150 provides information for both identified sets of CSFs to the user.

According to an embodiment, the user provides a composite score function by which ML service 150 may calculate a single composite target performance metric from the multiple target performance metrics identified by the user. In this way, ML service 150 identifies a single set of CSFs as the "overall optimal" set of CSFs for a given workload based on predicted optimization of the composite target performance metric. For example, a given user indicates the following joint target performance metrics for workload 160: maximizing a throughput performance metric, and minimizing a maximum latency performance metric. In this example, the user also provides a composite score function of (throughput+1000*max_latency) by which ML service 150 calculates a composite target performance metric for each set of CSFs identified for workload 160.

According to this example, ML service 150 tests multiple sets of CSFs for workload 160 according to techniques described above, including a particular set of CSFs that is predicted to have throughput performance metric=30000, and maximum latency performance metric=0.5. Using the composite score function, ML service 150 determines that the composite performance metric for the particular identified set of CSFs is 30500. By comparing the composite performance metrics similarly calculated for all identified sets of CSFs, ML service 150 identifies a set of CSFs, for workload 160, having the highest composite performance metric.

Training Data Generation Framework

According to an embodiment, the training corpus that is used to train the ML models described herein is automatically assembled by a machine learning-driven training data generation framework which, e.g., is implemented by ML service 150. Specifically, ML service 150 collects an initial training corpus from available database performance-related data sources such as records of historical database operations and/or established database benchmarks such as TPC-C, TPC-H, etc. According to an embodiment, ML service 150 populates the initial training corpus with benchmarking features, including CSFs and WSFs, and resulting performance metrics from such data sources.

One source of training data is historical records of real-world database operations. For example, cloud-based database services provide the opportunity for users to share non-sensitive profiling data from their workloads. Such data may represent a wider variety of benchmarking features, and resulting performance metrics, than other sources of data such as synthetic benchmarking workloads. Some examples of information that may be provided in (or derived from) such historical records include:

Ratios of different types of high-level operations (inserts, updates, queries) among workload operations;
Rates of index updates;
Rates of storage expansion or re-organization;
Rates of buffer cache misses and flushes; and
Ratios of database commit operations to total numbers of database operations.

Building an AC-ML model to identify optimal sets of CSFs for database workloads benefits from a training corpus that covers a wide range of possible values. However, even with good access to data sources recording workload information, the set of training data derived from these sources may not provide information on the full range of performance metrics, database features, and benchmarking features. Thus, according to an embodiment, the training data generation framework formulates and causes to be run experiments to generate additional training data that is not present in an initial training corpus.

Furthermore, instead of sampling data points within valid benchmarking features and running experiments on all of the identified valid values, which would require a huge amount of time and resources, embodiments utilize machine learning techniques to reduce the search space over the valid benchmarking features. According to an embodiment, the training data generation framework uses machine learning techniques to automatically identify areas of deficiency in the existing training data, and to perform experiments designed to generate data to remedy these deficiencies. The machine learning-based approach to expanding the training corpus allows for targeted data gathering, which minimizes the overall time required for data gathering, and also minimizes resource consumption required to expand the training corpus in the targeted areas.

According to an embodiment, based on the content of the initial training corpus, the training data generation framework schedules one or more experiments on one or more valid values of impactful configuration parameters, which were sampled from the training corpus. After collecting the results of those initial experiments, the training data generation framework uses machine learning techniques to identify, based on the impact to performance metrics from those initial experiments, a next set of valid values on which to base further experiments. The training data generation framework formulates these experiments to cover as wide as the variety of database features, benchmarking features, and performance metrics as possible. According to an embodiment, at least a portion of these experiments focus on parts of the search space that is likely to attain significant performance improvement based on machine learning techniques.

Accordingly, FIG. 3 depicts a flowchart 300 for a training data generation framework automatically performing experiments, using known workloads, to expand the amount of usable data in the training corpus. At step 302, one or more machine learning models are trained, to produce one or more trained machine learning models, using a training corpus with data regarding database workloads, including benchmarking features and performance metrics of the database workloads. For example, ML service 150 uses an existing training corpus (such as the initial training corpus described above) that includes benchmarking features, including configuration parameter values and resulting performance metrics, to train one or more data generation machine learning (DG-ML) models to predict values for data generation experiments.

Picking a Basis for an Experiment

At step 304 of flowchart 300, one or more experimental values for one or more configuration parameters are identified using the one or more trained machine learning models. For example, ML service 150 formulates, using the one or more trained DG-ML models, an experiment to generate data to expand a current training corpus. This formulated experiment includes one or more workload features to test and also a set of experimental CSFs (or particular values of configuration parameters) to use when running a workload that utilizes the identified one or more workload features. According to an embodiment, the sets of experimental CSFs vary values of impactful configuration parameters identified via the CPE-ML models described above.

ML service 150 has access to a library of known workloads, which includes metadata that describes the workloads. For example, the metadata for a given known workload in the library indicates particular WSFs that characterize the workload, as well as one or more database features utilized by the workload such as efficient query, efficient insert, efficient table scan, etc. For a given experiment, ML service 150 identifies one or more workload features to explore and selects one or more workloads, from the library of known workloads, which are associated with the identified one or more workload features. According to an embodiment, ML service 150 performs inference over the DG-ML models to identify workload features for a given experiment.

For example, based on performance of inference over trained DG-ML models, ML service 150 determines that relatively little information is known about the database feature: efficient insert. For example, ML service 150 performs inference, over one or more trained DG-ML models, based on all of the values of insert features in the current training corpus. From this inference, ML service 150 determines that less than a pre-determined threshold of performance metrics variation is found within the current training corpus for insert-based features.

According to an embodiment, the determination that additional information is needed for a particular feature is based on existing performance metrics values obtained from the training data corpus. For example, ML service 150 determines that the range of throughput performance metrics in the training data corpus is (15000, 30000), and that a majority of the training data throughput performance metrics are in the range of (15000, 18000). Specifically, in this example, ML service 150 determines that over a 75% threshold amount of the throughput performance metric data in the corpus spans less than a 25% threshold amount of the total range of throughput performance metric data present in the corpus. Based on determining that the throughput performance metric data in the training data corpus is unevenly distributed across the known range of the data, ML service 150 determines that that the variation in throughput performance metric data is less than the pre-determined threshold of performance metrics variation.

In response to determining that the throughput performance metric data in the training data corpus is less than the pre-determined threshold of performance metrics variation, ML service 150 schedules one or more experiments that are predicted to produce throughput performance metrics in the range of throughput performance metrics that is underrepresented in the training corpus, e.g., (18000, 30000). To prepare for these experiments, ML service 150 performs inference over the one or more trained DG-ML models to identify CSFs that the DG-ML models predict will produce throughput data in the under-represented range. ML service 150 schedules one or more experiments over workloads having insert features using the identified CSFs.

ML service 150 formulates one or more experiments to test one or more sets of CSFs, information for which is not present in the current training corpus in the context of efficient insert-type database operations. ML service 150 selects one or more workloads, from the library of known workloads, metadata for which indicates that the workloads utilize efficient insert and which have other workload features identified for the experiment, i.e., using machine learning techniques.

ML service 150 schedules, for each of the selected workloads, an experiment with each of the identified sets of experimental CSFs. When added to the training corpus, the results of this series of experiments regarding efficient insert provide information previously missing from the training corpus regarding this database feature. In this way, the experiments target areas of deficiency in the training corpus thereby efficiently using resources to expand the training corpus where needed.

According to an embodiment, ML service 150 identifies multiple workloads, from the data store of available workloads, over which to run a particular series of experiments involving the identified one or more sets of experimental CSFs. In this embodiment, ML service 150 selects the multiple workloads to have a wide range of workload features (including size, the kind of query operations being used, number of rows input to each query operation), focusing particularly on workload features that are not currently fully represented in the training corpus. In this embodiment, a series of experiments involves running all of the identified workloads using each of the identified sets of experimental CSFs.

According to an embodiment, ML service 150 identifies the one or more sets of experimental CSFs to use for a series of experiments based on performing inference over the one or more trained DG-ML models to identify one or more configuration parameter values that are likely to cause changes to one or more target performance metrics in the case of the identified database feature and/or workload features represented by the one or more selected workloads. Using machine learning to identify experimental CSFs allows the system to focus experimentation on those areas of the configuration parameter space that are likely to result in useful information, i.e., data for the training corpus that indicates configuration parameter values that affect performance metrics.

Training Data Generation Framework: Running an Experiment

At step 306 of flowchart 300, a particular experiment is automatically run by causing a database management system to manage a particular workload based on the one or more experimental values for the one or more configuration parameters. For example, ML service 150 causes to be run a particular experiment, from the series of experiments described in the example above, using a particular identified workload from the library of workloads and a particular set of experimental CSFs.

According to an embodiment, ML service 150 is communicatively coupled to a scheduling service 170, depicted in FIG. 1 as running on a server device 116. Scheduling service 170 maintains scheduling information that comprises a list of scheduled experiments, formulated by ML service 150. In order to cause the particular experiment to be run, ML service 150 sends information identifying the particular workload and the identified set of experimental CSFs to scheduling service 170, which adds the experiment information to the list of experiments in the scheduling information. According to an embodiment, the list of experiments maintained by scheduling service is an ordered list, which by default is ordered as first-in-first-out.

According to an embodiment, before adding information for a given experiment to the list, scheduling service 170 determines whether an experiment that is already included in the list accomplishes the same purpose of the given experiment. For example, two experiments accomplish the same purpose if the experiments run workloads having one or more of the same WSFs and/or the same database feature focus, using one or more of the same experimental CSFs. If an experiment is already scheduled that accomplishes the purpose of the given experiment, scheduling service 170 does not add the information for the given experiment to the list.

Scheduling service 170 monitors available resources in network 100 and automatically causes experiments at the top of the list to be run on available hardware as it becomes available. Scheduling service 170 maintains information about which experiments are in progress on what hardware in network 100. When multiple server devices are available to run experiments at the same time, scheduling service 170 schedules experiments to be run in parallel, with each server device running a portion of or all of one or more experiments, according to the available capacity of the hardware.

According to an embodiment, scheduling service 170 periodically rebalances the load of experiments being run on available resources in network 100 to most efficiently utilize the available resources and to complete the experiments in as timely a manner as possible. Such rebalancing depends on the relative priorities of scheduled and running experiments, such that higher priority experiments get scheduled to be run ahead of other experiments on available machines that are able to efficiently run the experiments. The determination of availability and efficiency of resources is based, at least in part, on current and/or past trends in resource utilization, and also on running time and resource requirements of historical experiments. Because experiments are distributed based on availability and historical information about experimentation, the resources in network 100 maintain balanced loads over time.

In this way, the training data generation framework efficiently utilizes available bandwidth to expand the training corpus. Specifically, because the experiments are tailored to explore data that is missing from the training corpus, the targeted experiments utilize only those resources needed to intelligently expand the training corpus. Furthermore, scheduling service 170 schedules the experiments to be run in parallel, and balanced across available nodes, when possible. This allows for the training data to be expanded as quickly as possible, which improves the quality of models that are trained based on the training corpus.

At step 308 of flowchart 300, data from the particular experiment, which comprises one or more resulting performance metrics from the particular experiment and the one or more experimental values for the one or more configuration parameters, is added to the training corpus to produce an updated training corpus. For example, as ML service 150 determines that a scheduled experiment has terminated, i.e., has run for a predetermined amount of time, ML service 150 automatically adds the information resulting from the experiment to the current training corpus.

Basing New Experiments on the Results of Past Experiments

According to an embodiment, ML service 150 uses the results of past experiments to formulate additional experiments. Specifically, embodiments continuously run rounds of experiments to generate additional useful training data. As the training data expands, the DG-ML models are periodically retrained resulting in increasingly accurate predictions of valid configuration parameter values that are likely to affect performance metrics to use for further experimentation. The results from prior experimentation are used to determine configuration and/or workload attribute variations from which to gather data for future experiments. For example, for a further experiment, ML service 150 identifies one or more experimental values for one or more configuration parameters based on determining that historical changes to the one or more configuration parameters had an impact on one or more performance metrics that is over a threshold amount of change.

Machine Learning Models

A machine learning model is trained using a particular machine learning algorithm. Once trained, input is applied to the machine learning model to make a prediction, which may also be referred to herein as a predicated output or output.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process, such as ML service 150, executing a machine learning algorithm applies the model artifact against the input to generate a predicted output. A computer system process executes a machine learning algorithm by executing software configured to cause execution of the algorithm.

Classes of problems that machine learning excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e., configurable) implementations of best of breed machine learning algorithms may be found in open source libraries such as Google's TensorFlow for Python and C++ or Georgia Institute of Technology's MLPack for C++. Shogun is an open source C++ ML library with adapters for several programming languages including C #, Ruby, Lua, Java, MatLab, R, and Python.

Feature Synthesis and Engineering

Feature synthesis is the process of transforming raw input into features that may be used as input to a machine learning model. Feature synthesis may also transform other features into input features. Feature engineering refers to the process of identifying features.

A goal of feature engineering is to identify a feature set with higher feature predicative quality for a machine learning algorithm or model. Features with higher predicative quality cause machine learning algorithms and models to yield more accurate predictions. In addition, a feature set with high predicative quality tends to be smaller and require less memory and storage to store. A feature set with higher predicative quality also enables generation of machine learning models that have less complexity and smaller artifacts, thereby reducing training time and execution time when executing a machine learning model. Smaller artifacts also require less memory and/or storage to store.

Artificial Neural Networks

An artificial neural network (ANN) is a machine learning model that at a high level models a system of neurons interconnected by directed edges. An overview of neural networks is described within the context of a layered feed-forward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the activation neuron is applied to the weighted input values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W are N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in a matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e., number of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e., ceases to reduce) or vanishes beneath a threshold (i.e., approaches zero). Example mathematical formulae and techniques for feedforward multilayer perceptrons (MLP), including matrix operations and backpropagation, are taught in a related reference "Exact Calculation Of The Hessian Matrix For The Multi-Layer Perceptron," by Christopher M. Bishop, the entire contents of which are hereby incorporated by reference as if fully set forth herein.

Model training may be supervised or unsupervised. For supervised training, the desired (i.e., correct) output is already known for each example in a training set. The training set is configured in advance by (e.g., a human expert) assigning a categorization label to each example. For example, the training set for optical character recognition may have blurry photographs of individual letters, and an expert may label each photo in advance according to which letter is shown. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Autoencoder implementation and integration techniques are taught in related U.S. patent application Ser. No. 14/558,700, titled "Auto-Encoder Enhanced Self-Diagnostic Components for Model Monitoring", the entire contents of which is hereby incorporated by reference as if fully set forth herein. That patent application elevates a supervised or unsupervised ANN model as a first class object that is amenable to management techniques such as monitoring and governance during model development such as during training.

Deep Context Overview

As described above, an ANN may be stateless such that timing of activation is more or less irrelevant to ANN behavior. For example, recognizing a particular letter may occur in isolation and without context. More complicated classifications may be more or less dependent upon additional contextual information. For example, the information content (i.e., complexity) of a momentary input may be less than the information content of the surrounding context. Thus, semantics may occur based on context, such as a temporal sequence across inputs or an extended pattern (e.g., compound geometry) within an input example. Various techniques have emerged that make deep learning be contextual. One general strategy is contextual encoding, which packs a stimulus input and its context (i.e., surrounding/related details) into a same (e.g., densely) encoded unit that may be applied to an ANN for analysis. One form of contextual encoding is graph embedding, which constructs and prunes (i.e., limits the extent of) a logical graph of (e.g., temporally or semantically) related events or records. The graph embedding may be used as a contextual encoding and input stimulus to an ANN.

Hidden state (i.e., memory) is a powerful ANN enhancement for (especially temporal) sequence processing. Sequencing may facilitate prediction and operational anomaly detection, which can be important techniques. A recurrent neural network (RNN) is a stateful MLP that is arranged in topological steps that may operate more or less as stages of a processing pipeline. In a folded/rolled embodiment, all of the steps have identical connection weights and may share a single one dimensional weight vector for all steps. In a recursive embodiment, there is only one step that recycles some of its output back into the one step to recursively achieve sequencing. In an unrolled/unfolded embodiment, each step may have distinct connection weights. For example, the weights of each step may occur in a respective column of a two dimensional weight matrix.

A sequence of inputs may be simultaneously or sequentially applied to respective steps of an RNN to cause analysis of the whole sequence. For each input in the sequence, the RNN predicts a next sequential input based on all previous inputs in the sequence. An RNN may predict or otherwise output almost all of the input sequence already received and also a next sequential input not yet received. Prediction of a next input by itself may be valuable. Comparison of a predicted sequence to an actually received (and applied) sequence may facilitate anomaly detection. For example, an RNN based spelling model may predict that a U follows a Q while reading a word letter by letter. If a letter actually following the Q is not a U as expected, then an anomaly is detected.

Unlike a neural layer that is composed of individual neurons, each recurrence step of an RNN may be an MLP that is composed of cells, with each cell containing a few specially arranged neurons. An RNN cell operates as a unit of memory. An RNN cell may be implemented by a long short term memory (LSTM) cell. The way LSTM arranges neurons is different from how transistors are arranged in a flip flop, but a same theme of a few control gates that are specially arranged to be stateful is a goal shared by LSTM and digital logic. For example, a neural memory cell may have an input gate, an output gate, and a forget (i.e., reset) gate. Unlike a binary circuit, the input and output gates may conduct an (e.g., unit normalized) numeric value that is retained by the cell, also as a numeric value.

An RNN has two major internal enhancements over other MLPs. The first is localized memory cells such as LSTM, which involves microscopic details. The other is cross activation of recurrence steps, which is macroscopic (i.e., gross topology). Each step receives two inputs and outputs two outputs. One input is external activation from an item in an input sequence. The other input is an output of the adjacent previous step that may embed details from some or all previous steps, which achieves sequential history (i.e., temporal context). The other output is a predicted next item in the sequence. Example mathematical formulae and techniques for RNNs and LSTM are taught in related U.S. patent application Ser. No. 15/347,501, titled "Memory Cell Unit and Recurrent Neural Network Including Multiple Memory Cell Units", the entire contents of which is hereby incorporated by reference as if fully set forth herein.

Sophisticated analysis may be achieved by a so-called stack of MLPs. An example stack may sandwich an RNN between an upstream encoder ANN and a downstream decoder ANN, either or both of which may be an autoencoder. The stack may have fan-in and/or fan-out between MLPs. For example, an RNN may directly activate two downstream ANNs, such as an anomaly detector and an autodecoder. The autodecoder might be present only during model training for purposes such as visibility for monitoring training or in a feedback loop for unsupervised training. RNN model training may use backpropagation through time, which is a technique that may achieve higher accuracy for an RNN model than with ordinary backpropagation. Example mathematical formulae, pseudocode, and techniques for training RNN models using backpropagation through time are taught in related W.I.P.O. patent application No. PCT/US2017/033698, titled "Memory-Efficient Backpropagation Through Time", the entire contents of which is hereby incorporated by reference as if fully set forth herein.

Random Forest

Random forests or random decision forests are an ensemble of learning approaches that construct a collection of randomly generated nodes and decision trees during the training phase. The different decision trees are constructed to be each randomly restricted to only particular subsets of feature dimensions of the data set. Therefore, the decision trees gain accuracy as the decision trees grow without being forced to over fit the training data as would happen if the decision trees were forced to be restricted to all the feature dimensions of the data set. Predictions for the time-series are calculated based on the mean of the predictions from the different decision trees.

The following is an example and non-limiting method of training a set of Random Forest models for making estimations of network I/O utilization for an example model type, i.e., an AC-ML model, according to an embodiment. A best trained Random Forest ML model is selected, from a set of models resulting from the training phase, to be the basis for instances of a trained ML model. In some embodiments, ML service 150 preprocesses the historical utilization data gathered from the data sources prior to labeling the training data that will be used to train the Random Forest ML model. The preprocessing may include cleaning the readings for null values, normalizing the data, downsampling the features, etc.

In an embodiment, ML service 150 receives hyper-parameter specifications for the Random Forest ML model to be trained. Without limitation, these hyper-parameters may include values of model parameters such as number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

ML service 150 trains the Random Forest ML model using the specified hyper-parameters and the training data set (or the preprocessed sequence training data, if applicable). The trained model is evaluated using the test and validation data sets, as described above.

According to embodiments, a determination is made of whether to generate another set of hyper-parameter specifications. If so, another set of hyper-parameter specifications is generated and ML service 150 trains another Random Forest ML model having the new set of hypermeters specified. All Random Forest ML models trained during this training phase are the set of models from which the best trained ML model is chosen.

Increasing Model Accuracy

The techniques described herein rely on building accurate machine learning models. Thus, according to embodiments, training each of the ML models involves using Auto-Feature-Selection (AutoFS), Auto-Model-Selection (AutoMS), and Auto-Hyperparameter-Tuning (MLAutoTune) to increase the effectiveness of the ML models.

AutoFS-Powered Feature Selection

Not all of the data in the training corpus is useful information for model building and inference described above. For example, information about log directories and database system version numbers do not affect performance metrics in a way that matters to the models described herein. Thus, according to an embodiment, ML service 150 utilizes an AutoFS framework to automatically apply feature engineering to the training of ML models, which is described in the AutoFS Application incorporated by reference above. Such automatic feature engineering avoids error-prone manual feature selections, and is more efficient than manual efforts given the large number of raw features in the training corpus.

According to an embodiment, ML service 150 focuses on the following three categories of features:

1. Features from database profiling information. These features are collected from the profiling data of database systems. Modern database systems provide a wide range of profiling data for tuning and troubleshooting purpose. Those features are a consequence of running a specific workload on certain database configurations. They are a source of information about the interaction between workloads and database systems. For example, MySQL provide global statistics and detailed operation history through performance schema.
2. Features from an underlying infrastructure running the database systems. Such features are collected directly by monitoring various performance related devices (like CPU, memory, I/O devices, network, etc.) in the underlying system. These features depict the behavior of system when workloads are running, and tend to reveal performance-related information like disk swaps, CPU performance, memory bottlenecks, etc.
3. Features derived from the workloads. These are features to characterize different workloads types. For example, the number of insert statements performed in a given workload could be a good differentiator of whether the workload is an analytical or transactional workload.

The above features are collected from the experiment results, which may contain noisy data that would negatively impact to model accuracy. AutoFS applies feature engineering to polish the feature set to remove unnecessary noise from the data. Specifically, AutoFS applies the following operations:

Removes unnecessary features. This will eliminate features having no correlation with the prediction target. For example, features with constant values will be dropped.

Converts categorical features into numerical features. Lots of raw features collected from database profiling are categorical, for example MySQL configuration parameter "innodb_change_buffering" could have possible values of "none" and "all". Such features may be converted to numerical features by assigning each possible value a unique integer value.

Applies normalization when applicable. Many raw features could have very different value ranges in different workload and system types. For example, MySQL feature "Innodb_data_writes" could have very high values for transactional queries, but relatively low for simple analytical queries.

AutoMS-Powered Model Selection

Embodiments improve database performance through automatically tuning a wide range of parameters in various database components. Different database components generally have a very different performance characteristics hidden in different training data features. Different machine learning models provide different ways to model those performance characteristics. As such, flexibility in model selection allows the system to automatically evaluate the effectiveness of various models on prediction accuracy and efficiency for the various different kinds of data being modeled.

For example, deep neural network models have been lately popularly used for various machine learning tasks based on its generality and accuracy. However, experimentation results indicate that RandomForest models sometimes achieve very good accuracy, when compared to some deep neural network models, because this type of model does not require the input features to be normalized.

Thus, according to an embodiment, ML service 150 utilizes an AutoMS framework to automatically pick the best model for the ML models in connection with training the ML models, as described in detail above, which is described in the AutoMS Application incorporated by reference above. The AutoMS framework will help enumerate a large number of machine learning models efficiently, and pick the best model with best prediction accuracy for the given prediction task.

ML Autotune Powered Model Tuning

The accuracy and runtime efficiency of a machine learning model heavily relies on proper setup of hyper-parameters in the model. For embodiments described herein, the issue of proper hyper-parameter selection becomes more impactful because of the very large training corpus and long model training time, and also because of user expectations for fast and accurate results for automatically tuning the configuration parameters of their systems. Manual tuning of model hyper-parameters can be time-consuming and costly because different hyper-parameters are needed for different prediction tasks (for different performance metrics, or different database component parameters), and also manual tuning of hyper-parameters can result in application of less-than-optimal parameter values for the models.

Thus, according to an embodiment, ML service 150 utilizes an MLAutoTune framework to automatically search the best hyper-parameters for model training, which is described in the MLAutoTune Application incorporated by reference above. MLAutoTune efficiently searches through possible hyper-parameter values, and narrows the possible hyper-parameter search space to quickly converge to the best choice. Because of its efficiency, it is possible to run the MLAutoTune framework to apply proper hyper-parameters for the best-pick machine learning model for each individual prediction task, instead of using a fixed set of hyper-parameters for the models as would be required without application of the MLAutoTune framework.

Architecture for Automatically Tuning Configuration Parameters

FIG. 1 is a block diagram that depicts an example network 100, according to one or more embodiments. Server device 114 is configured with ML service 150, server device 116 is configured with a scheduling service 170, and server device 118 is configured with a DBMS running workload 160. ML service 150 or scheduling service 170 may be implemented in any number of ways, including as a stand-alone application running on the server device, web services running on the device, etc. An application, such as a database server of DBMS and embodiments of ML service 150 and scheduling service 170 described herein, runs on a computing device and comprises a combination of software and allocation of resources from the computing device. Specifically, an application is a combination of integrated software components and an allocation of computational resources, such as memory, and/or processes on the computing device for executing the integrated software components on a processor, the combination of the software and computational resources being dedicated to performing the stated functions of the application.

Communication between hardware of network 100 may be implemented with any type of medium and/or mechanism that facilitates the exchange of information between computing devices. In an embodiment, each of the techniques described herein are performed automatically and may be implemented using one or more computer programs, other software or hardware elements, and/or digital logic in any of a general-purpose computer or a special-purpose computer, while performing data retrieval, transformation, and storage operations that involve interacting with and transforming the physical state of memory of the computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
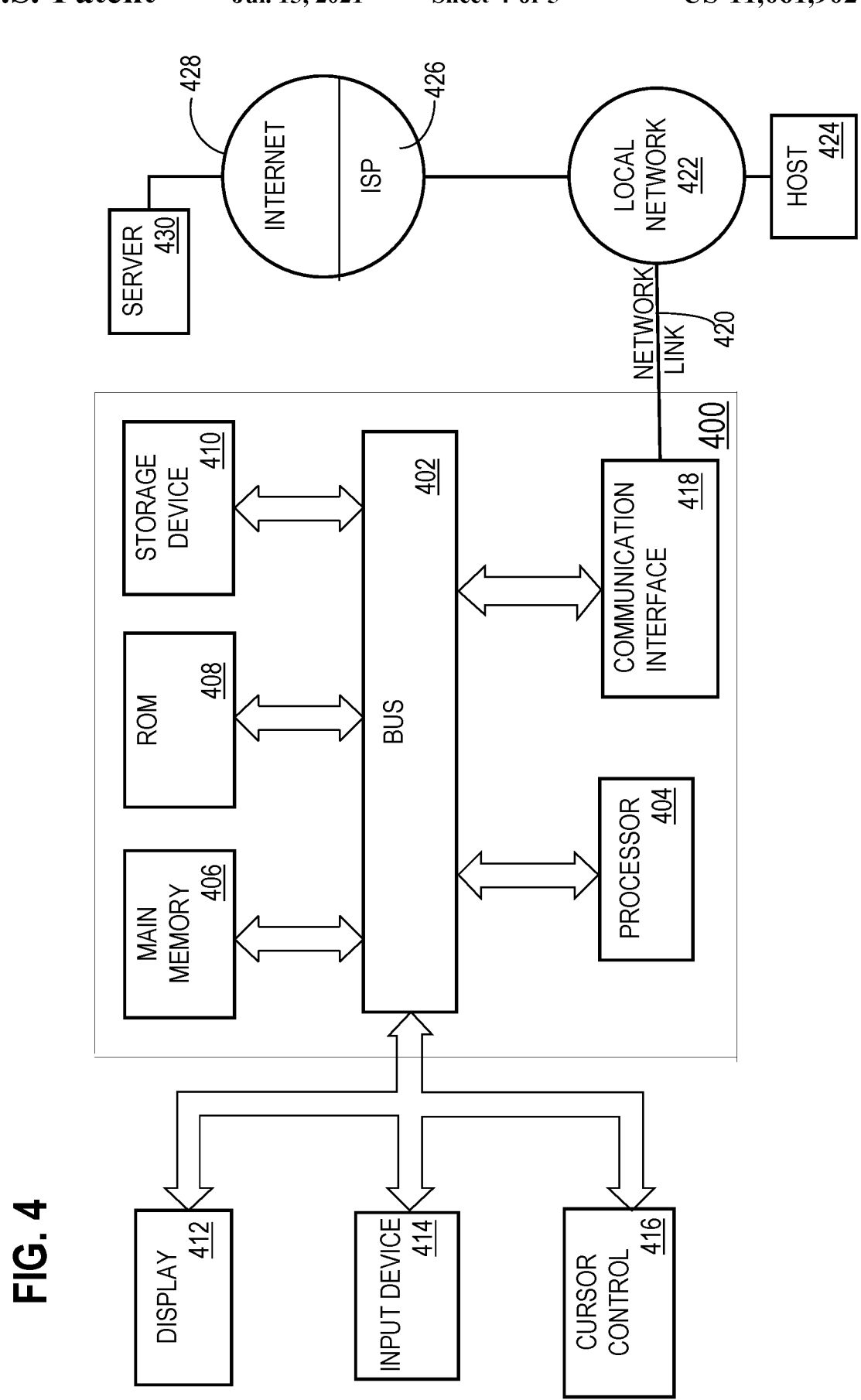
FIG. 4 depicts a computer system that may be used in an embodiment.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
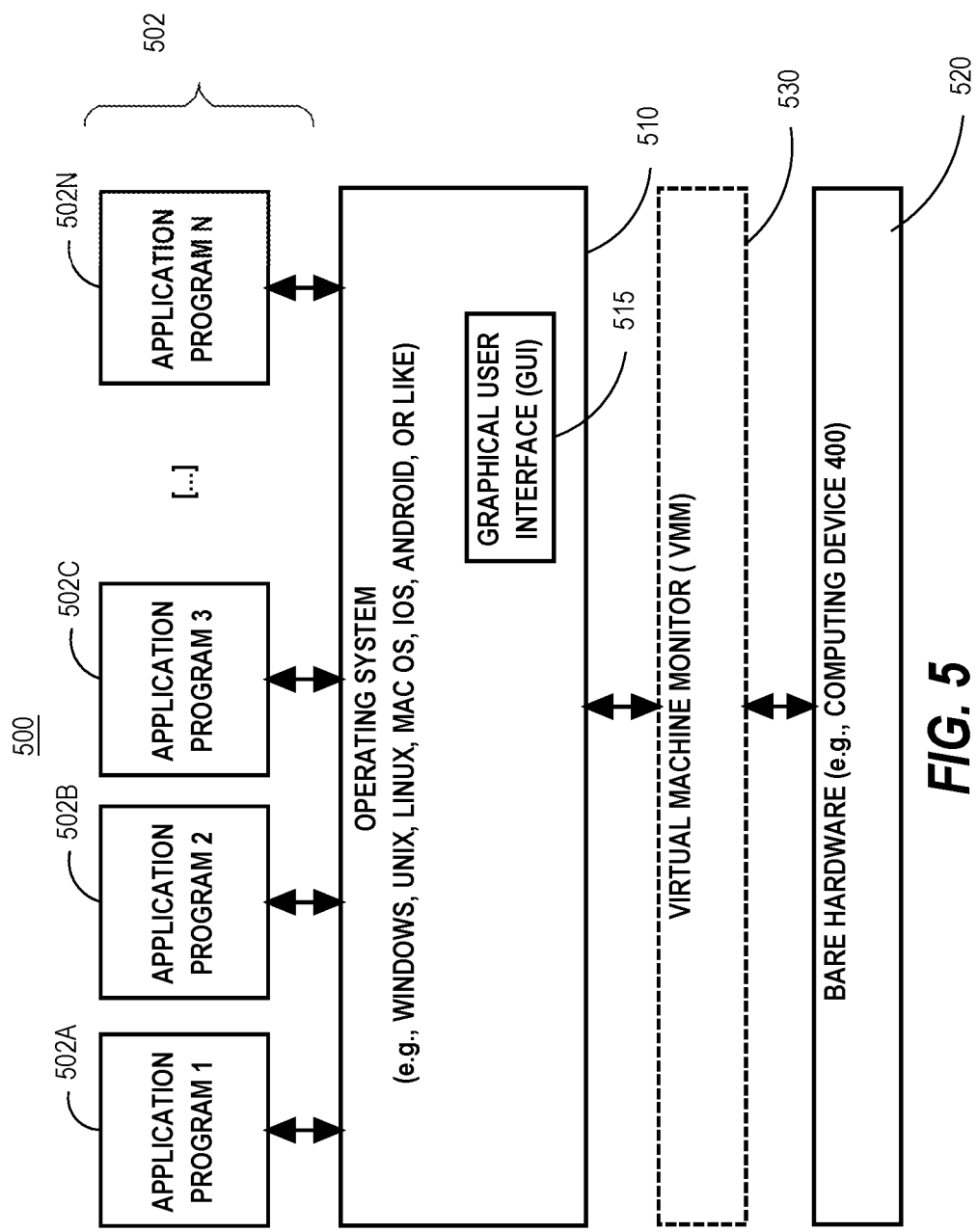
FIG. 5 depicts a software system that may be used in an embodiment.

FIG. 5 is a block diagram of a basic software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:

extracting one or more workload-specific features of a particular database workload running at a database system;

wherein the one or more workload-specific features of the particular database workload characterize utilization of the particular database workload;

based, at least in part, on the one or more workload-specific features of the particular database workload, identifying, using one or more trained machine learning models, a particular set of configuration-specific features for the particular database workload to optimize one or more performance metrics;

wherein the particular set of configuration-specific features comprises values for a set of configuration parameters of the database system for the particular database workload; and automatically applying the particular set of configuration-specific features to the database system for the particular database workload;

wherein the method is performed by one or more computing devices.

2. The method of claim 1, wherein the one or more trained machine learning models are one or more first trained machine learning models, the method further comprising:

identifying, using one or more second trained machine learning models, a set of impactful configuration parameters for a particular database management system;

wherein identifying the particular set of configuration-specific features comprises:

testing, using the one or more first trained machine learning models, various values for each of the set of impactful configuration parameters, and during the testing, keeping constant values for configuration parameters other than those in the set of impactful configuration parameters.

3. The method of claim 1, further comprising identifying the particular set of configuration-specific features from among a plurality of candidate sets of configuration-specific features for the particular database workload using one or more optimization strategies from a group of optimization strategies that comprises: random search, grid search, and Bayesian optimization.

4. The method of claim 1, further comprising:

determining whether one or more predicted performance metrics, predicted for the particular database workload given the particular set of configuration-specific features, satisfy one or more target performance metrics for the particular database workload;

wherein said automatically applying the particular set of configuration-specific features to the database system for the particular database workload is performed in response to determining that the one or more predicted performance metrics satisfy the one or more target performance metrics for the particular database workload.

5. The method of claim 1, wherein:

the particular set of configuration-specific features comprises one or more of:

an amount of memory available for the particular database workload, types of joins allowed to be used for queries over the particular database workload, kinds of operators that are allowed to be used for the particular database workload, or whether indexes are enabled for the particular database workload; and the one or more workload-specific features comprise one or more of:

a number of different kinds of operations being used in queries over a dataset of the particular database workload, an extent of the queries over the dataset, binary lengths of records being inserted into the dataset, data types being used in queries over the dataset, a number of joins in queries over the dataset, or aggregation-type operations being performed over the dataset.

6. The method of claim 1, wherein:

the one or more workload-specific features comprise one or more simple workload-specific features comprising:

a number of different kinds of operations being used in queries over a dataset of the particular database workload, an extent of the queries over the dataset, binary lengths of records being inserted into the dataset, data types being used in queries over the dataset, a number of joins in queries over the dataset, or aggregation-type operations being performed over the dataset; and the one or more workload-specific features further comprise an aggregate workload-specific feature that represents a particular ratio of two simple workload-specific features.

7. The method of claim 1, wherein said steps of identifying and applying are performed in response to one of:

determining that one or more workload-specific features of the particular database workload have changed; or determining that a particular performance metric of the particular database workload does not satisfy a corresponding performance requirement for the particular database workload.

8. The method of claim 1, further comprising training one or more machine learning models, to produce the one or more trained machine learning models, using a training corpus with data regarding a plurality of historical database workloads, including configuration-specific features, workload-specific features, and performance metrics of the plurality of historical database workloads.

9. The method of claim 8, further comprising, prior to training the one or more machine learning models, automatically identifying one or more features, from the training corpus, to eliminate from use in training the one or more machine-learning models.

10. The method of claim 8, further comprising:

prior to training the one or more machine learning models, automatically identifying a particular type of machine learning model, from a plurality of types of machine-learning models, to use for the one or more machine learning models;

wherein the one or more trained machine learning models are of the particular type of machine learning model.

11. The method of claim 8, further comprising, prior to training the one or more machine learning models, automatically identifying one or more hyper-parameters to use for the one or more machine-learning models.

12. A computer-executed method comprising:

training one or more machine learning models, to produce one or more trained machine learning models, using a training corpus with data regarding database workloads, including benchmarking features and performance metrics of the database workloads;
identifying, using the one or more trained machine learning models, one or more experimental values for one or more configuration parameters;
automatically running a particular experiment by causing a database management system to manage a particular database workload based on the one or more experimental values for the one or more configuration parameters; and
adding, to the training corpus to produce an updated training corpus, data from the particular experiment that comprises one or more resulting performance metrics from the particular experiment and the one or more experimental values for the one or more configuration parameters;
wherein the method is performed by one or more computing devices.

13. The method of claim 12, further comprising:
scheduling, in scheduling information, the particular experiment to be run on one or more particular computing devices;
wherein automatically running the particular experiment is performed in response to a particular computing device of the one or more particular computing devices running the particular experiment according to the scheduling information.

14. The method of claim 12, wherein:
the particular experiment is run on a particular computing device of a plurality of computing devices; and
the method further comprises:
automatically running a second experiment on a second computing device of the plurality of computing devices,
wherein the second experiment is run, at least partially, in parallel with running the particular experiment.

15. The method of claim 12, further comprising:
wherein the particular database workload is one of a plurality of workloads available for running experiments;
wherein each workload, of the plurality of workloads, is associated with metadata that characterizes a type of said each workload;
prior to running the particular experiment:
determining, using the one or more trained machine learning models, a selected type of workload for the particular experiment, and
selecting the particular database workload based on the particular database workload being associated with metadata indicating the selected type of workload.

16. The method of claim 15, wherein the one or more trained machine learning models determine the type of workload for the particular experiment based on a lack of information for the type of workload in the training corpus.

17. The method of claim 12, further comprising retraining the one or more machine learning models, to produce one or more updated trained machine learning models, using the updated training corpus.

18. The method of claim 12, wherein identifying the one or more experimental values for the one or more configuration parameters is based on determining that historical changes to the one or more configuration parameters had an impact on one or more performance metrics that is over a threshold amount of change.

19. One or more non-transitory computer-readable media storing one or more sequences of instructions that, when executed by one or more processors, cause:

extracting one or more workload-specific features of a particular database workload running at a database system;
wherein the workload-specific features of the particular database workload characterize utilization of the particular database workload;
based, at least in part, on the one or more workload-specific features of the particular database workload, identifying, using one or more trained machine learning models, a particular set of configuration-specific features for the particular database workload to optimize one or more performance metrics;
wherein the particular set of configuration-specific features comprises values for a set of configuration parameters of the database system for the particular database workload; and
automatically applying the particular set of configuration-specific features to the database system for the particular database workload.

20. The one or more non-transitory computer-readable media of claim 19, wherein the one or more trained machine learning models are one or more first trained machine learning models, the one or more sequences of instructions further comprising instructions that, when executed by one or more processors, cause:
identifying, using one or more second trained machine learning models, a set of impactful configuration parameters for a particular database management system;
wherein identifying the particular set of configuration-specific features comprises:
testing, using the one or more first trained machine learning models, various values for each of the set of impactful configuration parameters, and
during the testing, keeping constant values for configuration parameters other than those in the set of impactful configuration parameters.

21. The one or more non-transitory computer-readable media of claim 19, wherein the one or more sequences of instructions further comprise instructions that, when executed by one or more processors, cause identifying the particular set of configuration-specific features from among a plurality of candidate sets of configuration-specific features for the particular database workload using one or more optimization strategies from a group of optimization strategies that comprises: random search, grid search, and Bayesian optimization.

22. The one or more non-transitory computer-readable media of claim 19, wherein the one or more sequences of instructions further comprise instructions that, when executed by one or more processors, cause:
determining whether one or more predicted performance metrics, predicted for the particular database workload given the particular set of configuration-specific features, satisfy one or more target performance metrics for the particular database workload;
wherein said automatically applying the particular set of configuration-specific features to the database system for the particular database workload is performed in response to determining that the one or more predicted performance metrics satisfy the one or more target performance metrics for the particular database workload.

23. The one or more non-transitory computer-readable media of claim 19, wherein:
the particular set of configuration-specific features comprises one or more of:

an amount of memory available for the particular database workload,
types of joins allowed to be used for queries over the particular database workload,
kinds of operators that are allowed to be used for the particular database workload, or
whether indexes are enabled for the particular database workload; and the one or more workload-specific features comprise one or more of:
a number of different kinds of operations being used in queries over a dataset of the particular database workload,
an extent of the queries over the dataset,
binary lengths of records being inserted into the dataset,
data types being used in queries over the dataset,
a number of joins in queries over the dataset, or
aggregation-type operations being performed over the dataset.

24. The one or more non-transitory computer-readable media of claim 19, wherein:
the one or more workload-specific features comprise one or more simple workload-specific features comprising:
a number of different kinds of operations being used in queries over a dataset of the particular database workload,
an extent of the queries over the dataset,
binary lengths of records being inserted into the dataset,
data types being used in queries over the dataset,
a number of joins in queries over the dataset, or
aggregation-type operations being performed over the dataset; and
the one or more workload-specific features further comprise an aggregate workload-specific feature that represents a particular ratio of two simple workload-specific features.

25. The one or more non-transitory computer-readable media of claim 19, wherein said steps of identifying and applying are performed in response to one of:
determining that one or more workload-specific features of the particular database workload have changed; or
determining that a particular performance metric of the particular database workload does not satisfy a corresponding performance requirement for the particular database workload.

26. The one or more non-transitory computer-readable media of claim 19, wherein the one or more sequences of instructions further comprise instructions that, when executed by one or more processors, cause training one or more machine learning models, to produce the one or more trained machine learning models, using a training corpus with data regarding a plurality of historical database workloads, including configuration-specific features, workload-specific features, and performance metrics of the plurality of historical database workloads.

27. The one or more non-transitory computer-readable media of claim 26, wherein the one or more sequences of instructions further comprise instructions that, when executed by one or more processors, cause, prior to training the one or more machine learning models, automatically identifying one or more features, from the training corpus, to eliminate from use in training the one or more machine-learning models.

28. The one or more non-transitory computer-readable media of claim 26, wherein the one or more sequences of instructions further comprise instructions that, when executed by one or more processors, cause:
prior to training the one or more machine learning models, automatically identifying a particular type of machine learning model, from a plurality of types of machine-learning models, to use for the one or more machine learning models;
wherein the one or more trained machine learning models are of the particular type of machine learning model.

29. The one or more non-transitory computer-readable media of claim 27, wherein the one or more sequences of instructions further comprise instructions that, when executed by one or more processors, cause, prior to training the one or more machine learning models, automatically identifying one or more hyper-parameters to use for the one or more machine-learning models.

30. One or more non-transitory computer-readable media storing one or more sequences of instructions that, when executed by one or more processors, cause:
training one or more machine learning models, to produce one or more trained machine learning models, using a training corpus with data regarding database workloads, including benchmarking features and performance metrics of the database workloads;
identifying, using the one or more trained machine learning models, one or more experimental values for one or more configuration parameters;
automatically running a particular experiment by causing a database management system to manage a particular database workload based on the one or more experimental values for the one or more configuration parameters; and
adding, to the training corpus to produce an updated training corpus, data from the particular experiment that comprises one or more resulting performance metrics from the particular experiment and the one or more experimental values for the onr or more configuration parameters.

31. The one or more non-transitory computer-readable media of claim 30, wherein the one or more sequences of instructions further comprise instructions that, when executed by one or more processors, cause:
scheduling, in scheduling information, the particular experiment to be run on one or more computing devices;
wherein automatically running the particular experiment is performed in response to a particular computing device of the one or more computing devices running the particular experiment according to the scheduling information.

32. The one or more non-transitory computer-readable media of claim 20, wherein:
the particular experiment is run on a particular computing device of a plurality of computing devices; and
the one or more sequences of instructions further comprise instructions that, when executed by one or more processors, cause:
automatically running a second experiment on a second computing device of the plurality of computing devices,
wherein the second experiment is run, at least partially, in parallel with running the particular experiment.

33. The one or more non-transitory computer-readable media of claim 30, wherein the one or more sequences of instructions further comprise instructions that, when executed by one or more processors, cause:

wherein the particular database workload is one of a plurality of workloads available for running experiments;

wherein each workload, of the plurality of workloads, is associated with metadata that characterizes a type of said each workload;

prior to running the particular experiment:
  determining, using the one or more trained machine learning models, a selected type of workload for the particular experiment, and
  selecting the particular database workload based on the particular database workload being associated with metadata indicating the selected type of workload.

34. The one or more non-transitory computer-readable media of claim 33, wherein the one or more trained machine learning models determine the type of workload for the particular experiment based on a lack of information for the type of workload in the training corpus.

35. The one or more non-transitory computer-readable media of claim 30, wherein the one or more sequences of instructions further comprise instructions that, when executed by one or more processors, cause retraining the one or more machine learning models, to produce one or more updated trained machine learning models, using the updated training corpus.

36. The one or more non-transitory computer-readable media of claim 30, wherein identifying the one or more experimental values for the one or more configuration parameters is based on determining that historical changes to the one or more configuration parameters had an impact on one or more performance metrics that is over a threshold amount of change.

* * * * *

UNITED STATES PATENT AND TRADEMARK OFFICE
CERTIFICATE OF CORRECTION

Page 1 of 2

PATENT NO. : 11,061,902 B2
APPLICATION NO. : 16/298837
DATED : July 13, 2021
INVENTOR(S) : Idicula et al.

It is certified that error appears in the above-identified patent and that said Letters Patent is hereby corrected as shown below:

On the Title Page

Column 1, under (72) Inventors, Line 4, delete "Nusha" and insert -- Nashua --, therefor.

On page 2, Column 1, under Other Publications, Line 1, delete "Algotithm" and insert -- Algorithm --, therefor.

On page 2, Column 1, under Other Publications, Line 36, delete "fro" and insert -- for --, therefor.

On page 2, Column 2, under Other Publications, Line 27, delete "Applicationsm" and insert -- Applications --, therefor.

On page 3, Column 1, under Other Publications, Lines 6-7, delete "Seletion" and insert -- Selection --, therefor.

On page 3, Column 2, under Other Publications, Line 5, delete "Microsodt" and insert -- Microsoft --, therefor.

On page 3, Column 2, under Other Publications, Line 11, delete "RBDMS"," and insert -- RDBMS", --, therefor.

In the Specification

In Column 1, Line 8, after "Appln." insert -- No. --.

In Column 5, Line 2, delete "values" and insert -- values. --, therefor.

In Column 7, Line 19, delete "workload specific" and insert -- workload-specific --, therefor.

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,061,902 B2

In Column 9, Lines 19-21, delete "According to an embodiment, this information includes the predicted performance metric for the identified optimal set of CSFs." and insert the same on Column 9, Line 18 as a continuation of the same paragraph.

In Column 13, Line 11, delete "that that" and insert -- that --, therefor.

In Column 18, Line 27, delete "and or" and insert -- and/or --, therefor.

In Column 19, Line 12, delete "perceptrons" and insert -- perceptron --, therefor.

In the Claims

In Column 34, Line 11, in Claim 29, delete "claim 27," and insert -- claim 26, --, therefor.

In Column 34, Line 18, in Claim 30, delete "non-transistory" and insert -- non-transitory --, therefor.

In Column 34, Line 38, in Claim 30, delete "onr" and insert -- one --, therefor.

In Column 34, Line 53, in Claim 32, delete "claim 20," and insert -- claim 30, --, therefor.